United States Patent
De Patto et al.

(10) Patent No.: US 9,249,260 B2
(45) Date of Patent: Feb. 2, 2016

(54) METHOD FOR PREPARING CARBONYLIC PERFLUOROPOLYETHERS

(75) Inventors: Ugo De Patto, Cogliate (IT); Giuseppe Marchionni, Milan (IT); Pier Antonio Guarda, Arese (IT)

(73) Assignee: SOLVAY SOLEXIS S.P.A., Bollate (IT)

( * ) Notice: Subject to any disclaimer, the term of this patent is extended or adjusted under 35 U.S.C. 154(b) by 547 days.

(21) Appl. No.: 12/595,037

(22) PCT Filed: Apr. 8, 2008

(86) PCT No.: PCT/EP2008/054230
§ 371 (c)(1),
(2), (4) Date: Oct. 7, 2009

(87) PCT Pub. No.: WO2008/122639
PCT Pub. Date: Oct. 16, 2008

(65) Prior Publication Data
US 2010/0121106 A1    May 13, 2010

(30) Foreign Application Priority Data
Apr. 10, 2007   (EP) ................................ 07425207

(51) Int. Cl.
*C07C 43/30*   (2006.01)
*C07C 53/46*   (2006.01)
*C08G 65/00*   (2006.01)
*C08G 65/322*   (2006.01)

(52) U.S. Cl.
CPC ............ *C08G 65/007* (2013.01); *C08G 65/322* (2013.01)

(58) Field of Classification Search
None
See application file for complete search history.

(56) References Cited

U.S. PATENT DOCUMENTS

| | | | |
|---|---|---|---|
| 3,442,942 A | 5/1969 | Sianesi et al. | |
| 3,650,928 A | 3/1972 | Sianesi et al. | |
| 3,665,041 A | 5/1972 | Sianesi et al. | |
| 3,715,378 A | 2/1973 | Belardinelli et al. | |
| 3,847,978 A | 11/1974 | Sianesi et al. | |
| 4,122,040 A * | 10/1978 | McCarroll et al. | 502/184 |
| 4,451,646 A | 5/1984 | Sianesi et al. | |
| 5,000,830 A | 3/1991 | Marchionni et al. | |
| 5,120,699 A * | 6/1992 | Weiss et al. | 502/185 |
| 5,144,092 A | 9/1992 | Marraccini et al. | |
| 5,258,110 A | 11/1993 | Sianesi et al. | |
| 5,744,651 A | 4/1998 | Marchionni et al. | |
| 2004/0024153 A1 | 2/2004 | Di Meo et al. | |
| 2005/0192413 A1 | 9/2005 | Marchionni et al. | |

FOREIGN PATENT DOCUMENTS

| | | |
|---|---|---|
| EP | 1388555 A2 | 2/2004 |
| EP | 1454938 A1 | 9/2004 |
| EP | 1524287 A1 | 4/2005 |
| GB | 1244189 A | 8/1971 |

OTHER PUBLICATIONS

Chambers et al. (J. Phys. Chem. B 1998, 102, 2251-2258).*
Wolfson et al. (Applied Catalysis A: General 208 (2001) 91-98).*

* cited by examiner

Primary Examiner — Rosalynd Keys
(74) Attorney, Agent, or Firm — Arent Fox LLP

(57) ABSTRACT

A process for preparing perfluoropolyethers of formula $$T-O-(R_F)_z-T' \quad (I)$$

wherein:

T, T' are end groups, z=0 or 1; $R_F$ is a perfluoro(poly)oxyalkylene chain containing one or more fluorooxyalkylene repeating units selected from the group consisting of $(CF_2O)$, $-(CF(CF_3)O)-$, $-(CF_2CF_2O)-$, $-(CF_2CF(CF_3)O)-$, $-(CF(CF_3)CF_2O)-$, $-(CF_2CF_2CF_2O)-$, $-(CF_2CF_2CF_2CF_2O)-$, and $-(CF_2)_j-CFZ-O-$ wherein j is an integer from 0 to 3, and Z is a fluorooxyalkylene chain comprising from 1 to 20 repeating units selected from the above reported fluorooxyalkylene units; comprising the reduction of peroxidic perfluoropolyethers comprising one or more of the above defined repeating units by using gaseous hydrogen in the presence of a catalyst comprising one or more metals of the VIII group supported on graphitic materials.

16 Claims, No Drawings

METHOD FOR PREPARING CARBONYLIC PERFLUOROPOLYETHERS

CROSS-REFERENCE TO RELATED APPLICATIONS

This application is a U.S. national stage application under 35 U.S.C. §371 of International Application No. PCT/EP2008/054230 filed Apr. 8, 2008, which claims priority to European Application No. 07425207.3 filed Apr. 10, 2007, these applications being incorporated herein by reference in their entirety for all purposes.

The present invention relates to a process for preparing perfluoropolyethers (PFPE) starting from peroxidic perfluoropolyethers.

In particular the present invention relates to a process for preparing carbonyl perfluoropolyethers (PFPE), preferably perfluoropolyethers (PFPE) having —COX end groups ($X=F, CF_3$), starting from peroxidic perfluoropolyethers.

More specifically the invention relates to a process comprising the reduction of the content of peroxidic —O—O— bonds in peroxidic perfluoropolyethers in the presence of hydrogen and of a supported catalyst, said process having a conversion higher than 95.0%, preferably higher than 99.0%, more preferably higher than 99.9%, in combination with an improved productivity.

Still more specifically the invention relates to a process comprising the use of a catalyst having an improved duration, defined as time at which the conversion of the peroxidic perfluoropolyether is higher than 95.0%, preferably higher than 99.0%, more preferably higher than 99.9%, generally of the order of at least 50 hours, preferably more than 100 hours, more preferably more than 200 hours.

Processes for preparing carbonyl perfluoropolyethers starting from peroxidic perfluoropolyethers by chemical reduction, for example with KI iodides or with an iodine/$SO_2$ mixture, in protic solvent, are known in the prior art. These processes however are complex, expensive and with a high environmental impact. As a matter of fact they require the use of notable amounts of protic solvents and several steps, as for example separations and washings. Furthermore, by means of said chemical reduction PFPEs having an ester functionality are obtained and PFPEs having carbonyl end groups —COX with X as defined above are not obtained, this kind of end groups being preferred for the successive functionalization reactions. In order to obtain, for example, a derivative having a carboxylic functionality with high conversion it is more suitable to use the corresponding PFPE having —COF end groups instead of the ester. Besides, the chemical reduction process, as described in U.S. Pat. No. 3,847,978, uses CFC-113 which cannot be used any longer owing to its high environmental impact (see the Montreal agreements and their successive modifications).

To overcome the described drawbacks, processes have been suggested for preparing carbonyl perfluoropolyethers terminated with —COX groups ($X=F, CF_3$) by reduction of peroxidic perfluoropolyethers with hydrogen in the presence of catalysts formed of supported metals of the VIII groups. For example, U.S. Pat. No. 3,847,978 describes the discontinuous reduction of peroxidic perfluoropolyethers by operating with $H_2$ in the presence of Pd supported on carbon.

Patent application US 2004/0024,153 describes the reduction in a discontinuous way of peroxidic perfluoropolyethers by operating with gaseous hydrogen in the presence of metals of the VIII group, for example Pd, supported on fluorides of metals of the II and III group, in particular $CaF_2$. These catalysts show a longer duration compared with the catalysts described in U.S. Pat. No. 3,847,978 (see the comparative examples of patent application US 2004/0024,153). Besides, the examples reported in this patent application are carried out in a discontinuous way. In the description of this patent application it is stated that the reported catalysts can be used also in the continuous process. Tests carried out by the Applicant have shown that these catalysts, for example $Pd/CaF_2$, used in the continuous process show a limited duration, of about 20 hours. As a matter of fact, by using the catalyst for longer times a product still containing unreacted peroxide is obtained and furthermore the conversion is very low. The so obtained product needs further steps of reduction of the residual peroxide. This brings to a notable reduction of the productivity in the desired product. Besides, by using this kind of catalyst in the continuous process, a conversion progressively decreasing in the time is observed after the indicated about 20 hours. Besides it has been observed that the conversion suffers also fluctuations in the time and this implies notable difficulties of the process control and the unreproduceability of the product quality. These phenomena represent a drawback since they require the use of fresh catalyst to avoid a decrease of the process productive capability and the product quality constancy. In any case, from the industrial point of view a catalyst having a catalytic activity for a so limited time cannot be used in a continuous process.

The need was therefore felt to have a continuous process for preparing carbonyl perfluoropolyethers (PFPEs) having —COX end groups wherein $X=F, CF_S$, having the following combination of properties:

- conversion higher than 95.0%, preferably higher than 99.0%, more preferably higher than 99.9%, of the peroxidic perfluoropolyether in the desired product;
- conversion of the peroxidic bonds not fluctuating in the time such as to obtain a perfluoropolyether with an amount of peroxidic —O—O— bonds generally lower than 500 ppm, preferably lower than 100 ppm, more preferably lower than 20 ppm, still more preferably lower than 2 ppm;
- high productivity by using a catalyst having an improved duration, generally of at least 50 hours, preferably more than 100 hours, more preferably more than 200 hours, where duration means the time at which conversion higher than at least 95.0% of the peroxidic perfluoropolyether takes place.

It has now unexpectedly and surprisingly been found that it is possible to avoid the drawbacks of the above mentioned prior art by using the process described hereinafter.

It is an object of the present invention a process for preparing perfluoropolyethers of formula $$T\text{-}O\text{---}(R_F)_z\text{-}T' \qquad (I)$$

wherein:

T, T' are end groups, $z=0$ or 1; $R_F$ is a (per)fluoro(poly)oxyalkylene chain containing one or more fluorooxyalkylene repeating units selected from $(CF_2O)$, $(CF(CF_3)O)$, $(CF_2CF_2O)$, —$(CF_2CF(CF_3)O)$—, —$(CF(CF_3)CF_2O)$—, —$(CF_2CF_2CF_2O)$, $(CF_2CF_2CF_2CF_2O)$, —$(CF_2)_j$—CFZ—O— wherein j is an integer from 0 to 3 and Z is a fluorooxyalkylene chain comprising from 1 to 20 repeating units selected from the above reported fluorooxyalkylene units; comprising the reduction of peroxidic perfluoropolyethers comprising one or more of the following fluorooxyalkylene repeating units $(CF_2O)$, $CF(CF_3)O)$, $(CF_2CF_2O)$, —$(CF_2CF(CF_3)O)$—, —$(CF(CF_3)CF_2O)$—, —$(CF_2CF_2CF_2O)$, $(CF_2CF_2CF_2CF_2O)$, —$(CF_2)_j$—CFZ—O— wherein j, Z are as defined above, by using gaseous hydrogen in the presence of a catalyst comprising one or more metals of the VIII group supported on graphitic materials.

Preferably the process of the present invention allows to prepare perfluoropolyethers of formula $$T-O-(R_F)_z-T' \qquad (I)$$

having a number average molecular weight in the range 200-8,000;

wherein:
T is selected from the functional end groups —$CF_2COF$, —$CF(CF_3)COF$, —$CF_2CF_2COF$, —$CF_2CF_2CF_2COF$, —$CF_2C(O)CF_3$, —COF;

T'=T or T' is selected from the non functional (neutral) end groups —$CF_3$, —$CF_2CF_3$, —$C_3F_7$, —$C_4F_9$, one fluorine atom can be substituted by one chlorine or hydrogen atom;

z, $R_F$ are as defined above, and comprises the reduction, in liquid phase, of perfluoropolyethers having peroxidic —O—O— bonds and comprising one or more of the above defined fluorooxyalkylene repeating units and having end groups selected from those mentioned above for T, T', and having an oxidizing power (PO), defined as grams of active oxygen per 100 grams of peroxidic perfluoropolyether, between 0.02% and 4.5%, preferably 0.2%-4.0%, more preferably 0.5%-4.0%, by using gaseous hydrogen, in the presence of a catalyst comprising one or more metals of the VIII group supported on graphitic materials.

The oxidizing power (PO) represents an index of the content of peroxidic —O—O— bonds in the peroxidic perfluoropolyethers.

The process temperature is generally in the range 20° C.-200° C., preferably 50° C.-160° C., more preferably 90° C.-150° C.

The pressure is preferably between 1 and 50 atm, more preferably between 1 and 10 atm.

The compounds (I) have a number average molecular weight between 200 and 5,000, more preferably 200-3500.

Examples of products obtainable with the above described process are:

for z=0
1. FCO—$CF_2OCF_2$—COF
2. $CF_3C(O)$—$CF_2OCF_2$—$C(O)CF_3$
3. $CF_3C(O)$—$CF_2OCF_2$—COF
4. FCO—O—COF
5. FCO—$OCF_2$—COF
6. FCO—$CF(CF_3)OCF(CF_3)$—COF
7. FCO—$CF(CF_3)OCF_2$—COF
8. FCO—$CF(CF_3)OCF_2$—$C(O)CF_3$
9. FCO—$CF_2OCF_2CF_2$—COF
10. $CF_3$—$CF_2OCF_2$—COF
11. $CF_3$—O—COF
12. $CF_3$—$CF_2O$—COF
13. $CF_3$—$OCF_2$—COF
14. $CF_3$—$OCF(CF_3)$—COF for z=1
15. FCO—$CF_2OCF_2CF_2OCF_2$—COF
16. FCO—$CF_2O(CF_2CF_2O)_2CF_2$—COF
17. FCO—$CF_2O(CF_2CF_2O)_3CF_2$—COF
18. FCO—$CF_2O(CF_2CF_2O)_4CF_2$—COF
19. FCO—$CF_2O(CF_2CF_2O)_5CF_2$—COF
20. FCO—$CF_2O(CF_2CF_2O)_6CF_2$—COF
21. FCO—$CF_2O(CF_2CF_2O)_7CF_2$—COF
22. FCO—$CF_2OCF_2OCF_2$—COF
23. FCO—$CF_2O(CF_2O)_2CF_2$—COF
24. FCO—$CF_2O(CF_2O)_3CF_2$—COF
25. FCO—$CF_2O(CF_2O)_4CF_2$—COF
26. FCO—$CF_2O(CF_2O)_5CF_2$—COF
27. FCO—$CF_2O(CF_2O)_6CF_2$—COF
28. FCO—$CF_2OCF_2CF_2OCF_2OCF_2CF_2OCF_2$—COF
29. FCO—$CF_2OCF_2OCF_2OCF_2CF_2OCF_2$—COF
30. FCO—$CF_2OCF_2CF_2$,$OCF_2OCF_2CF_2OCF_2CF_2OCF_2$—COF
31. FCO—$CF_2OCF_2OCF_2OCF_2CF_2OCF_2CF_2OCF_2$—COF
32. FCO—$CF_2OCF_2CF_2OCF_2OCF_2OCF_2CF_2OCF_2$—COF
33. FCO—$CF_2OCF_2OCF_2CF_2OCF_2OCF_2CF_2OCF_2$—COF
34. FCO—$CF_2OCF_2OCF_2OCF_2OCF_2CF_2OCF_2$—COF
35. FCO—$CF_2OCF_2OCF_2OCF_2CF_2OCF_2OCF_2$—COF
36. FCO—$CF_2OCF_2CF_2OCF_2CF_2OCF_2CF_2OCF_2CF_2OCF_2$—COF
37. FCO—$CF_2OCF_2CF_2OCF_2CF_2OCF_2OCF_2CF_2OCF_2$—COF
38. FCO—$CF_2OCF_2OCF_2OCF_2CF_2OCF_2CF_2OCF_2CF_2OCF_2$—COF
39. FCO—$CF_2OCF_2OCF_2CF_2OCF_2OCF_2CF_2OCF_2CF_2OCF_2$—COF
40. FCO—$CF_2OCF_2OCF_2CF_2OCF_2OCF_2OCF_2CF_2OCF_2$—COF
41. FCO—$CF_2OCF_2CF_2OCF_2OCF_2CF_2OCF_2CF_2OCF_2$—COF
42. FCO—$CF_2OCF_2CF_2OCF_2CF_2OCF_2OCF_2CF_2OCF_2$—COF
43. FCO—$CF_2OCF_2OCF_2OCF_2OCF_2CF_2OCF_2CF_2OCF_2$—COF
44. FCO—$CF_2OCF_2OCF_2OCF_2CF_2OCF_2CF_2OCF_2$—COF
45. FCO—$CF_2OCF_2OCF_2OCF_2CF_2OCF_2CF_2OCF_2$—COF
46. FCO—$CF_2OCF_2OCF_2CF_2OCF_2OCF_2CF_2OCF_2$—COF
47. FCO—$CF_2OCF_2CF_2OCF_2OCF_2OCF_2CF_2OCF_2$—COF
48. FCO—$CF_2OCF_2CF_2OCF_2OCF_2OCF_2CF_2OCF_2$—COF
49. FCO—$CF_2OCF_2OCF_2OCF_2OCF_2OCF_2CF_2OCF_2$—COF
50. FCO—$CF_2OCF_2OCF_2OCF_2OCF_2CF_2OCF_2OCF_2$—COF
51. FCO—$CF_2OCF_2OCF_2OCF_2CF_2OCF_2OCF_2OCF_2$—COF
52. FCO—$CF_2OCF_2OCF_2CF_2OCF_2$—COF
53. FCO—$CF_2OCF_2OCF_2CF_2OCF_2CF_2OCF_2$—COF
54. FCO—$CF_2OCF_2OCF_2CF_2OCF_2CF_2OCF_2CF_2OCF_2$—COF
55. FCO—$CF_2OCF_2OCF_2CF_2OCF_2CF_2OCF_2CF_2OCF_2CF_2OCF_2$—COF
56. FCO—$CF_2OCF_2OCF_2CF_2OCF_2CF_2OCF_2CF_2OCF_2CF_2OCF_2CF_2OCF_2$—COF
57. FCO—$CF_2OCF_2OCF_2CF_2OCF_2OCF_2$—COF
58. FCO—$CF_2OCF_2OCF_2CF_2OCF_2CF_2OCF_2OCF_2$—COF
59. FCO—$CF_2OCF_2OCF_2CF_2OCF_2CF_2OCF_2CF_2OCF_2OCF_2$—COF 60. FCO—CF$_2$OCF$_2$OCF$_2$CF$_2$OCF$_2$CF$_2$OCF$_2$CF$_2$OCF$_2$CF$_2$OCF$_2$OCF$_2$—COF
61. FCO—CF$_2$OCF$_2$OCF$_2$CF$_2$OCF$_2$CF$_2$OCF$_2$CF$_2$OCF$_2$CF$_2$OCF$_2$CF$_2$OCF$_2$OCF$_2$—COF
62. FCO—CF$_2$OC$_3$F$_6$OCF$_2$—COF
63. FCO—CF$_2$O(C$_3$F$_6$O)$_2$CF$_2$—COF
64. FCO—CF$_2$O(C$_3$F$_6$O)$_3$CF$_2$—COF
65. FCO—CF$_2$O(C$_3$F$_6$O)$_4$CF$_2$—COF
66. FCO—CF$_2$O(C$_3$F$_6$O)$_5$CF$_2$—COF
67. FCO—CF(CF$_3$)OC$_3$F$_6$OCF(CF$_3$)—COF
68. FCO—CF(CF$_3$)O(C$_3$F$_6$O)$_2$CF(CF$_3$)—COF
69. FCO—CF(CF$_3$)O(C$_3$F$_6$O)$_3$CF(CF$_3$)—COF
70. FCO—CF(CF$_3$)O(C$_3$F$_6$O)$_4$CF(CF$_3$)—COF
71. FCO—CF(CF$_3$)O(C$_3$F$_6$O)$_5$CF(CF)—COF
72. FCO—CF$_2$OC$_3$F$_6$OCF$_2$CF$_2$OC$_3$F$_6$OCF$_2$—COF
73. FCO—CF$_2$OC$_3$F$_6$OCF$_2$CF$_2$OC$_3$F$_6$OCF$_2$CF$_2$OC$_3$F$_6$OCF$_2$—COF
74. FCO—CF$_2$OC$_3$F$_6$OCF$_2$CF$_2$OC$_3$F$_6$OCF$_2$CF$_2$OC$_3$F$_6$OCF$_2$CF$_2$OC$_3$F$_6$OCF$_2$—COF
75. FCO—CF(CF$_3$)OCF$_2$CF$_2$OCF(CF$_3$)—C OF
76. FCO—CF(CF$_3$)OCF$_2$CF$_2$OC$_3$F$_6$OCF$_2$CF$_2$OCF(CF$_3$)—COF
77. FCO—CF(CF$_3$)OCF$_2$CF$_2$OC$_3$F$_6$OCF$_2$CF$_2$OC$_3$F$_6$OCF$_2$CF$_2$OCF(CF$_3$)—COF
78. CF$_3$—OCF$_2$CF$_2$OCF$_2$—COF
79. CF$_3$—O(CF$_2$CF$_2$O)$_2$CF$_2$—COF
80. CF$_3$—O(CF$_2$CF$_2$O)$_3$CF$_2$—COF   CF$_3$—O(CF$_2$CF$_2$O)$_4$CF$_2$—COF
82. CF$_3$—O(CF$_2$CF$_2$O)$_5$CF$_2$—COF
83. CF$_3$—O(CF$_2$CF$_2$O)$_6$CF$_2$—COF
84. CF$_3$OCF$_2$OCF$_2$—COF
85. CF$_3$—O(CF$_2$O)$_2$CF$_2$—COF
86. CF$_3$—O(CF$_2$O)$_3$CF$_2$—COF
87. C$_3$F$_6$—OC$_3$F$_6$OCF$_2$—COF
88. C$_3$F$_6$—O(C$_3$F$_6$O)$_2$CF$_2$—COF
89. C$_3$F$_6$—O(C$_3$F$_6$O)$_3$CF$_2$—COF
90. C$_3$F$_6$—O(C$_3$F$_6$O)$_4$CF$_2$—COF
91. C$_3$F$_6$—O(C$_3$F$_6$O)$_5$CF$_2$—COF
92. CF$_3$—OC$_3$F$_6$OCF(CF$_3$)—COF
93. CF$_3$—O(C$_3$F$_6$O)$_2$CF(CF$_3$)—COF
94. CF$_3$—O(C$_3$F$_6$O)$_3$CF(CF$_3$)—COF
95. CF$_3$—O(C$_3$F$_6$O)$_4$CF(CF$_3$)—COF
96. CF$_3$—O(C$_3$F$_6$O)$_5$CF(CF$_3$)—COF More preferably the above described process allows to obtain carbonyl perfluoropolyethers of formula

  (I)

wherein:
T, T', equal to or different from each other are selected from the above defined end groups with the proviso that the non functional end groups are preferably lower than 10% molar with respect to the total of the end groups T and T', more preferably lower than 5%, still more preferably lower than 3%;
z, $R_F$ and the number average molecular weight are as defined above; starting from peroxidic perfluoropolyethers of formula.

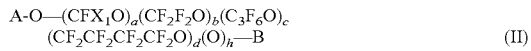  (II)

wherein:
A, B, equal to or different from each other, are selected from the groups defined above for T, T';

$X_1$=F, CF$_3$;
the a, b, c, d, h indexes are integers, zero included, such that the number average molecular weight of the peroxide (II) is between 300 and 150,000 and the h index is an integer different from zero such as to have a PO in the above defined range, where (C$_3$F$_6$O) can be a linear or branched unit.

When the peroxide PO is higher than 2 it is preferable to dilute it with a suitable solvent, for example the same product (I) obtained from the reaction, in order to avoid uncontrollable esotherm problems. Examples of other classes of usable solvents are fluorocarbons, perfluorocarbons, perfluoro(poly)ethers, hydrofluoro(poly)ethers.

The preferred compounds of formula (I) are those having z=1 and containing at least one unit selected from the units (CFX$_1$O) with X$_1$=F, CF$_3$, (CF$_2$CF$_2$O), (C$_3$F$_6$O), (CF$_2$CF$_2$CF$_2$O), the unit (C$_3$F$_6$O) can be linear or branched. Those of formula (I) having a content of non functional end groups lower than 10% are more preferred.

In the products of formula (I) $R_F$ is preferably selected from the following structures:

a) 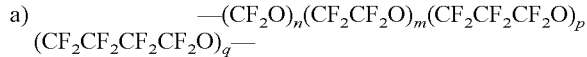

wherein the indexes m, n, p, q are integers, zero included, such that the number average molecular weight is as indicated above; preferably when n is different from zero min is between 0, 1-10, extremes included; when (m+n) is different from zero (p+q)/(m+n) is between 0 and 0.2, extremes included;

b) 

wherein r, s, t, u are integers, zero included, such that the number average molecular weight is as defined above; when s is different from zero r/s is between 0.1 and 10, extremes included; when (r+s) is different from zero (t+u)/(r+s) is between 0.01 and 0.5, extremes included;

c) 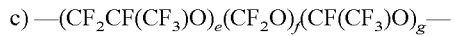

wherein e, f, g are integers, zero included, such that the number average molecular weight is as defined above; when e is different from zero (f+g)/e is between 0.01 and 0.5, extremes included.

The peroxidic PFPEs can be prepared, for example, by photoassisted polymerization of tetrafluoroethylene (TFE) and/or hexafluoropropene (HFP), also in admixture with each other, in the presence of oxygen according to what described, for example, in U.S. Pat. Nos. 3,442,942; 3,650,928; 3,665,041.

The peroxidic PFPEs containing the units —(CF$_2$)$_j$—CFZ—O— can be prepared, for example, according to what described in U.S. Pat. No. 5,144,092 by polymerization, in the presence of oxygen and UV, of one or more (per)fluoroalkylvinylethers of formula. CF$_2$=CFOXa wherein Xa is one or more groups (R'O)$_m$R", equal to or different from each other, wherein m=0-6, R' is selected from the groups —CF$_2$—, —CF$_2$CF$_2$—, —CF$_2$CF(CF$_3$)—, R" is selected from C$_1$-C$_{10}$ linear perfluoroalkyl, or C$_3$-C$_{10}$ branched perfluoroalkyl, or C$_3$-C$_{10}$ cyclic perfluoroalkyl, by operating in the presence of solvent and at a temperature not higher than 50° C. This same process can be carried out also in the presence of TFE and/or HFP. See furthermore, for example, EP 1,454,938, EP 1,524,287.

The peroxidic perfluoropolyethers of formula (II) are generally liquid. Preferably the peroxidic perfluoropolyethers are selected from the following classes:

(1) Xo-O(CF$_2$CF$_2$O)$_{r1}$(CF$_2$O)$_{s1}$(O)$_{t1}$-Xo' wherein

Xo and Xo', equal to or different from each other, are —CF$_2$Cl, —CF$_2$CF$_2$Cl, —CF$_3$, —CF$_2$CF$_3$, —CF$_2$COF, —COF;

r1, s1, t1 are integers such that the number average molecular weight is as defined above, preferably between 500 and 100,000; r1/s1 is between 0.1 and 10, s1 being different from zero; t1 is an integer such that the PO is in the above defined range.

The above described peroxidic perfluoropolyethers can be prepared by tetrafluoroethylene oxypolymerization by following the teachings of U.S. Pat. Nos. 3,715,378, 4,451,646, 5,258,110, 5,744,651;

(2) X3-O(CF$_2$CF$_2$O)$_{r2}$(CF$_2$O)$_{s2}$(CF(CF$_3$)O)$_{u2}$(CF$_2$CF(CF$_3$)O)$_{v2}$(O)$_{t2}$—X3' wherein

X3 and X3', equal to or different from each other, are —CF$_2$Cl, —CF$_2$CF$_2$Cl, —CF$_2$CF$_3$, —CF$_3$, —C$_3$F$_7$, —CF(CF$_3$)COF, —COF, —CF$_2$COF, —CF$_2$C(O)CF$_3$;

r2, s2, t2, u2, v2 are integers, zero comprised, such that the number average molecular weight is as defined above, preferably between 700 and 80,000; t2 is a number such that the PO is in the above defined range.

The above described peroxidic perfluoropolyethers can be prepared by oxypolymerization of tetrafluoro-ethylene and perfluoropropene by following the teachings of U.S. Pat. Nos. 5,000,830 and 3,847,978;

(3) X2-O(CF$_2$CF$_2$O)$_{r3}$(CF$_2$O)$_{s3}$(CF$_2$(CF$_2$)$_w$CF$_2$O)$_{k3}$(O)$_{t3}$—X2' wherein

X2 and X2', equal to or different from each other, are —CF$_2$COF, —COF;

w=1 or 2;

r3, s3, t3 and k3 are integers such that the number average molecular weight is between 700 and 100,000, preferably 700-80,000; r3/s3 is between 0.2 and 10, k3/(r3+s3) is lower than 0.05 and t3 is an integer such that the PO is as defined above.

The above described peroxide perfluoropolyethers can be prepared by following the teachings of patent application US 2005/192,413.

If one wishes to obtain the compounds of formula (I) having an amount of non functional end groups lower than 10%, it is preferable to use peroxidic perfluoropolyethers of class 1) or 2) with a high molecular weight and high PO, for example molecular weight higher than 20,000 and PO higher than 1.

If peroxidic perfluoropolyethers of class 3) are used, the obtained compounds of formula (I) have exclusively functional end groups, irrespective to the molecular weight and of the PO of the starting peroxide.

In the process of the present invention, besides the above described products of formula (I), also HF and some non ether carbonyl compounds as for example COF$_2$, COF—COF, CF$_3$COCOF, are obtained, which are collected and then separated so to be recovered for further uses.

The gaseous hydrogen is continuously fed in stoichiometric amount with respect to the fed peroxide moles. It is also possible to operate with a light stoichiometric hydrogen excess, normally of the order of 10%.

As metals of the VIII group of the catalyst, Pd, Pt, Rh, Ru, Ir, Os and their mixtures can be mentioned. Pd. Pt are preferred, Pd more preferred.

The metal concentration on the support is generally between 0.1% and 10% with respect to the total weight of the catalyst, preferably between 1% and 5% by weight.

The support used in the catalyst of the present invention is a graphitic material comprising graphitic carbon. With graphitic carbon, all the carbon varieties containing carbon in the allotropic form of the graphite are meant. The crystalline graphite structure in the support can be detected by X ray diffraction methods. The graphitic support has generally a surface area between 0.1 and 1,000 m$^2$/g, preferably 1-500 m$^2$/g, more preferably 10-350 m$^2$/g. Surface area values between 10 and 50 m$^2$/g, 50-100 m$^2$/g, 100-350 m$^2$/g, or between 350 and 500 m$^2$/g, 500-800 m$^2$/g, 800-1.000 m$^2$/g can also be used. The catalysts of the present invention can be used in the form of pellets or fine powders. The pellet granulometry ranges from 1 to 5 mm. The powder granulometry is generally comprised between 0.5 and 300 micron, preferably 1-200 micron, more preferably 10-100 micron.

As said, the catalyst of the present invention comprises as support graphitic carbon. The catalyst can contain also other supports provided that the graphitic carbon is present as essential component. Preferably a support formed of graphitic carbon, more preferably graphite, is used. In this case the catalyst amount is between 0.001% and 10%, preferably 0.01%-5% by weight with respect to the peroxidic perfluoropolyether. If the support comprises also other supports besides the graphitic carbon, the used amounts are higher.

Metals of the VIII group supported on graphitic materials are known in the prior art and are generally used for producing electrodes for fuel cells thanks to the high electric conductivity properties of graphitic materials.

The process of the present invention is preferably carried out in a continuous way, by continuously feeding the peroxide and the hydrogen, removing then the HF formed during the reaction, for example under continuous hydrogen flow.

The Applicant has surprisingly and unexpectedly found that the catalysts as defined above are capable to reduce the content of the peroxidic —O—O— bonds in the peroxidic perfluoropolyethers obtaining a very high conversion, not fluctuating and constant in the time. Indeed a product free from peroxidic bonds is obtained, generally in an amount lower than 500 ppm, preferably lower than 100 ppm, more preferably lower than 20 ppm, still more preferably lower than 2 ppm. Therefore the catalysts as defined above can be advantageously used in continuous processes.

Furthermore it has been found that the catalysts used in the process of the present invention show a long duration, here meant as time at which a conversion higher than 95.0% of the peroxidic perfluoropolyether in the desired carbonyl product takes place, preferably higher than 99.0%, more preferably higher than 99.9%, of at least 50 hours, preferably more than 100 hours, more preferably more than 200 hours. Therefore the catalysts used in the process of the present invention do not need frequent replacements thus guaranteeing a high productivity and the decrease of the process costs.

The process of the present invention can be advantageously carried out also in a discontinuous way by initially feeding in the reactor all the peroxide and the catalyst and continuously feeding hydrogen. As a matter of fact it has been surprisingly and unexpectedly found by the Applicant that, also in the discontinuous process, the above described catalysts, for example Pd supported on graphite, are more active in the reduction of the peroxidic bonds, compared with the Pd supported on CaF$_2$ or Pd supported on carbon (see the examples wherein, the conditions being equal, the necessary times for reducing all the peroxide result lower for the catalysts of the invention).

Some illustrative but not limitative examples of the invention follow.

EXAMPLES

Characterization
PO determination

The oxidizing power (PO), defined as grams of active oxygen per 100 grams of product, of the peroxidic perfluoropolyether and of the final product is determined by reacting a known amount of a sample dissolved in an inert fluorinated solvent (H-Galden ZT 85) with alcoholic solution of sodium iodide and potentiometrically titring the iodine released from said reaction, with a solution having a known titre of sodium thiosulphate.

The PO value expressed in ppm is a submultiple of the percent value and indicates the mg of active oxygen contained in 1 kg of product.

The method has a sensitivity limit of 2 ppm of PO.
Determination of Molecular Weights and Structures The number average molecular weight, the content of end groups and the PFPE structure are determined by NMR $^{19}$F spectroscopy (Varian XL 200 spectrophotometer).
Conversion With conversion it is meant the percentage of peroxidic —O—O— bonds which are reduced. It is calculated as complement to 100 of the percent ratio between the PO (ppm) of the outcoming product and the PO of fed peroxide.
Catalyst Characterization The catalysts of the present invention and the comparative catalysts are used in the form of fine powder and have the characteristics described in Table 1.

TABLE 1

| | Catalysts | | | |
|---|---|---|---|---|
| | I | II | III (comp) | IV (comp) |
| Catalyst | | | | |
| Support | Graphite | Graphite | CaF$_2$ | Carbon |
| Palladium content (% by weight) | 3 | 1.5 | 1.5 | 5 |
| Surface area (B.E.T.) (m$^2$/g) | 305 | 12 | 24 | 900 |
| Particle sizes (microns) | | | | |
| 10% by weight | <1.5 | <5 | <5 | <7 |
| 50% by weight | <10 | <18 | <12 | <28 |
| 90% by weight | <45 | <47 | <23 | <85 |

Examples 1-5

Continuous Process

Example 1

In a 500 ml AISI 316 stirred reactor equipped with electric resistance heating and with a continuous feeding system of peroxidic mixture and hydrogen and one filter for the continuous extraction of the reaction mixture, 0.36 g of catalyst (I) containing 3% by weight of Pd are introduced. In the same reactor 400 g of peroxidic perfluoropolyether previously obtained by photochemical oxidation of the tetrafluoroethylene (by following the teachings of U.S. Pat. Nos. 3,715,378 and 4,451,646) are introduced. The peroxidic PFPE has the following formula $$A-O-(CF_2O)_a(CF_2CF_2O)_b(O)_h-B \quad (II)$$

wherein b/a=2.4;

A and B, equal to or different from each other, are the following chain end groups: —CF$_3$ (49% molar); —CF$_2$COF (51% molar). The PFPE of formula (II) has a number average molecular weight of 37,500 and a PO equal to 1.48%.

The mixture is heated under nitrogen flow at 130° C. maintaining the pressure at 4 atm. Hydrogen is then introduced with a flow of 10 Nlb and after one hour the peroxidic PFPE is fed by means of a pump at a flow rate of 200 g/h.

The vent of the outflowing gases, prevailingly containing HF, is conveyed to an alkaline scrubber using KOH at 10%.

Samples of the product are periodically drawn by a suitable bubbling inlet and the oxidizing power is determined thereon. All the analyzed samples result to have PO null (PO <2 ppm). Therefore after 62 hours of continuous running the test is interrupted in the light of the good peroxide conversion results. The peroxide conversion is calculated as the complement to 100% of the percent ratio between the PO (ppm) of the coming out product and the PO of the fed peroxide.

The structure of the obtained product, determined by NMR $^{19}$F corresponds to the formula $$T-O-(CF_2O)_n(CF_2CF_2O)_m-T'$$

wherein m/n=2.4;

T and T', equal to or different from each other, are chain end groups —CF$_3$ (1.2% molar), —CF$_2$COF (98.8% molar) and the number average molecular weight is equal to 1,080. The results obtained in this example are summarized in table 2.

Example 2

By repeating the procedure used in the example 1, it is studied the reduction reaction of the peroxidic bonds of the peroxidic perfluoropolyether prepared in the example 1 in the presence of 2.0 g of catalyst (II) Pd/graphite containing 1.5% by weight of palladium with respect to the catalyst weight. The test is carried out for total 232 hours. During this period of time the conversion appeared constantly good since all the samples drawn and analyzed have shown PO <2 ppm. The obtained results are summarized in table 2.

Example 3(Comparative)

By repeating the procedure used in example 1, it is studied the reduction reaction of the peroxidic bonds of the peroxidic perfluoropolyether prepared in example 1 in the presence of 5 g of catalyst (III) Pd/calcium fluoride containing 1.5% by weight of palladium with respect to the catalyst weight.

The test is interrupted after total 20 hours of running owing to the continuous conversion fluctuations. As a matter of fact during this period the catalyst activity appeared very low, with conversion generally lower than 95% and inconstant even though a catalyst amount higher than that of the example 2 was used. The obtained results are summarized in table 2.

Example 4 (Comparative)

The example 3 was repeated by decreasing the peroxidic PFPE flow-rate to 100 g/h and by using 5 g of catalyst (III), palladium/calcium fluoride, containing 1.5% by weight of palladium with respect to the catalyst weight.

The test is carried out for 108 hours and then stopped since the conversion starts to be lower than 95% (progressive conversion decrease).

In the early 16 hours the catalyst allows to obtain a product having a null PO. Later the conversion is fluctuant and progressively decreasing and the product with null PO is occasionally obtained. The obtained results are summarized in table 2.

Example 5(Comparative)

By repeating the procedure used in the example 1 it is studied the reduction reaction of the peroxidic bonds of the peroxidic perfluoropolyether prepared in the example 1 in the presence of 2 g of catalyst Pd on Carbon Engelhard (IV) containing 5% by weight of palladium with respect to the catalyst weight. The test is interrupted after 5 hours owing to difficulties in extracting the product through the filter due to the high viscosity which is typical of the starting peroxide. As a matter of fact in the preceding hours the PO of the discharged product was very high and similar to the PO of the fed PFPE, indicating thereby a quick catalyst poisoning. The obtained results are summarized in table 2.

The data reported in table 2 show that, the Pd concentration on the support (1.5%) being equal and the surface area being similar (catalyst (II) and (III)), the Pd supported on $CaF_2$ (catalyst (III)) shows a peroxide (PO) reduction activity fluctuating in the time and much lower than that of the catalyst (II) of the present invention, even using an about double amount of catalyst (5 g vs 2 g). See the example 2 compared with the example 3 (comparative).

Furthermore, even by halving the peroxide flow-rate to 100 g/h (see comparative example 4) for increasing the contact times, the comparative catalyst (III) shows a good reduction activity only in the early 16 hours of reaction. After said period of time, indeed, a fluctuation and reduction of the activity is observed, indicating a slow and progressive catalyst poisoning. Example 2 has to be compared with example 4 (comparative).

TABLE 2

Examples 1-5 for continuous process

| | Example | | | | |
|---|---|---|---|---|---|
| | 1 | 2 | 3 (comp) | 4 (comp) | 5 (comp) |
| Catalyst | I | II | III | III | IV |
| Support | Graphite | Graphite | $CaF_2$ | $CaF_2$ | Carbon |
| Cat Area (m²/g) | 305 | 12 | 24 | 24 | 900 |
| g of cat. | 0.36 | 2.0 | 5.0 | 5.0 | 2.0 |
| % weight of Pd | 3.0 | 1.5 | 1.5 | 1.5 | 5 |
| Mg of Pd | 10.8 | 30 | 75 | 75 | 100 |
| T (° C.) | 130 | 130 | 130 | 130 | 130 |
| P (atm) | 4 | 4 | 4 | 4 | 4 |
| P.O. (ppm) | 14800 | 14800 | 14800 | 14800 | 14800 |
| G/h peroxide | 200 | 200 | 200 | 100 | 200 |
| Nl/h of $H_2$ | 10 | 10 | 10 | 10 | 10 |

| Reaction hours | P.O. of the product (ppm) | | | | |
|---|---|---|---|---|---|
| 2 | — | — | 1700 | <2 | 5700 |
| 4 | <2 | <2 | 890 | <2 | 12380 |
| 6 | <2 | <2 | 1260 | <2 | (*) |
| 8 | <2 | <2 | 500 | <2 | |
| 10 | <2 | <2 | 1280 | <2 | |
| 12 | <2 | <2 | 1670 | <2 | |
| 14 | <2 | <2 | 480 | <2 | |

TABLE 2-continued

Examples 1-5 for continuous process

| | Example | | | | |
|---|---|---|---|---|---|
| | 1 | 2 | 3 (comp) | 4 (comp) | 5 (comp) |
| 16 | <2 | <2 | 1010 | <2 | |
| 18 | <2 | <2 | 560 | 210 | |
| 20 | <2 | <2 | 630 | <2 | |
| 22 | <2 | <2 | | <2 | |
| 24 | <2 | <2 | | 100 | |
| 26 | <2 | <2 | | 110 | |
| 28 | <2 | <2 | | <2 | |
| 30 | <2 | <2 | | 40 | |
| 32 | <2 | <2 | | <2 | |
| 34 | <2 | <2 | | 120 | |
| 36 | <2 | <2 | | 140 | |
| 38 | <2 | <2 | | 80 | |
| 40 | <2 | <2 | | 120 | |
| 42 | <2 | <2 | | 310 | |
| 44 | <2 | <2 | | <2 | |
| 46 | <2 | <2 | | 240 | |
| 48 | <2 | <2 | | 105 | |
| 50 | <2 | <2 | | <2 | |
| 62 | <2 | <2 | | 110 | |
| 72 | | <2 | | 220 | |
| 82 | | <2 | | 610 | |
| 108 | | <2 | | 840 | |
| 161 | | <2 | | | |
| 232 | | <2 | | | |

(*) the test is stopped after 5 hours of reaction owing to difficulties in extracting the reaction product Examples 6-13

Discontinuous Process

Example 6

By following the teaching of U.S. Pat. Nos. 3,715,378 and 4,451,646 a peroxidic PFPE of formula

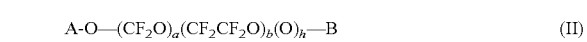

$$A-O-(CF_2O)_a(CF_2CF_2O)_b(O)_h-B \quad \text{(II)}$$

is prepared, wherein b/a=2.3;

A and B, equal to or different from each other, are the following chain end groups —$CF_3$ (50% molar); —$CF_2COF$ (50% molar). The peroxide has a number average molecular weight of 46,800 and a PO equal to 1.28%.

120 g of this peroxidic perfluoropolyether and 0.05 g of catalyst (I) (Pd supported on Graphite), are introduced in a 250 ml reactor made of fluorinated polymer. The reactor is heated by thermostatic bath and the stirring is guaranteed by a magnet kept at 1,000 rev/min. The reactor is equipped with a bubbling inlet to allow the inlet of hydrogen and nitrogen at atmospheric pressure, with a sonde for the temperature measurement and with a bubbling inlet for drawing the samples.

The vent of the outflowing gases, containing HF mainly, is conveyed to an alkaline scrubber for acid gases containing 500 ml of KOH at 10%.

The mixture is heated under nitrogen flow and when the temperature has reached 130° C., the nitrogen flow is interrupted and 1 Nl/h of hydrogen is fed.

The reaction is checked by drawing samples at regular intervals from the suitable bubbling inlet. When the reaction is over, (after 2.5 hours) the hydrogen flow is interrupted and the reactor is let cool down to room temperature under nitrogen flow. It is discharged and then the product is recovered by filtration on PTFE filter.

The product analyzed by NMR $^{19}$F has the following formula

T-O—(CF$_2$O)$_n$(CF$_2$CF$_2$O)$_m$-T' wherein m/n=23;
T and T', equal to or different from each other, are chain end groups —CF$_3$ (1.3% molar), —CF$_2$COF (98.7% molar) and the number average molecular weight is equal to 1,270. The results obtained in this example are summarized in table 3.

Example 7

In the same equipment used in the example 6, 119 g of the peroxidic perfluoropolyether prepared in example 6 and 0.11 g of catalyst (II) Pd/graphite containing 1.5% by weight of palladium with respect to the catalyst weight, are introduced. By following the same procedure of the example 6, 1 Nl/h of hydrogen is fed in the reactor maintained at 130° C. The reaction is checked by analysing the PO of the drawn samples.

After 4 hours the product has PO <2 ppm and the test is stopped. The results obtained in this example are summarized in table 3.

Example 8 (Comparative)

By repeating the procedure used in the example 6, it is studied the reduction reaction of the peroxidic bonds of 120 g of the peroxidic perfluoropolyether prepared in example 6, in the presence of 0.11 g of catalyst (III) (Pd/calcium fluoride) containing 1.5% by weight of palladium with respect to the catalyst weight. After 4.5 hours of reaction the product has PO <2 ppm. The obtained results are summarized in table 3.

Example 9 (Comparative)

By repeating the procedure used in the example 6, it is studied the reduction reaction of the peroxidic bonds of 118 g of the peroxidic perfluoropolyether prepared in example 6, in the presence of 0.04 g of catalyst (IV) (Pd/carbon) containing 5% by weight of palladium with respect to the catalyst weight. After 5.5 hours of reaction the product has PO <2 ppm. The obtained results are summarized in table 3.

Example 10

By repeating the procedure used in the example 6, it is studied the reduction reaction of the peroxidic bonds of 121 g of the peroxidic perfluoropolyether prepared in example 6, in the presence of 0.59 g of catalyst (II) (Pd/graphite) containing 1.5% by weight of palladium with respect to the catalyst weight. After 3 hours of reaction the product has PO <2 ppm. The obtained results are summarized in table 3.

Example 11 (Comparative)

By repeating the procedure used in the example 6 it is studied the reduction reaction of the peroxidic bonds of 120 g of the peroxidic perfluoropolyether prepared in example 6, in the presence of 0.60 g of catalyst (III) (Pd/calcium fluoride) containing 1.5% by weight of palladium with respect to the catalyst weight. The amounts of catalyst and Pd are substantially equal to those of the example 10. After 4 hours of reaction the product has PO <2 ppm. The obtained results are summarized in table 3.

Example 12 (Comparative)

By repeating the procedure used in the example 6, it is studied the reduction reaction of the peroxidic bonds of 120 g of the peroxidic perfluoropolyether prepared in example 6, in the presence of 0.18 g of catalyst (IV) (Pd/carbon) containing 5% by weight of palladium with respect to the catalyst weight. After 4 hours of reaction the product has PO <2 ppm. The obtained results are summarized in table 3.

Example 13

By repeating the procedure used in the example 6, it is studied the reduction reaction of the peroxidic bonds of 120 g of the peroxidic perfluoropolyether prepared in example 6, in the presence of 0.01 g of catalyst (I) (Pd/graphite) containing 3% by weight of palladium with respect to the catalyst weight. After 4.5 hours of reaction the product has PO <2 ppm. The obtained results are summarized in table 3.

TABLE 3

EXAMPLES 6-13 for discontinuous process

| | | | | Example | | | | | |
|---|---|---|---|---|---|---|---|---|---|
| | | 6 | 7 | 8 comp | 9 comp | 10 | 11 comp | 12 comp | 13 |
| Catalyst | | I | II | III | IV | II | III | IV | I |
| Support | | Graphite | Graphite | CaF$_2$ | Carbon | Graphite | CaF$_2$ | Carbon | Graphite |
| Catalyst amount (g) | | 0.05 | 0.11 | 0.11 | 0.04 | 0.59 | 0.60 | 0.18 | 0.01 |
| Pd content (% by wt) | | 3.0 | 1.5 | 1.5 | 5.0 | 1.5 | 1.5 | 5.0 | 3.0 |
| Pd amount (mg) | | 1.5 | 1.7 | 1.7 | 2.0 | 8.9 | 9.0 | 9.0 | 0.3 |
| Time (hours) | | | | | PO (ppm) | | | | |
| 0 | | 12770 | 12770 | 12770 | 12770 | 12770 | 12770 | 12770 | 12770 |
| 1 | | 7000 | 9700 | 9970 | 10060 | 7980 | 8940 | 9650 | 10430 |
| 2 | | 2410 | 6200 | 7200 | 8180 | 3320 | 5470 | 6140 | 8010 |
| 2.5 | | <2 | | | | | | | |
| 3 | | | 2540 | 4330 | 5640 | <2 | 1810 | 2970 | 4730 |
| 4 | | | <2 | 940 | 3010 | | <2 | <2 | 1580 |
| 4.5 | | | | <2 | | | | | <2 |
| 5 | | | | | 480 | | | | |
| 5.5 | | | | | <2 | | | | |

The data of Table 3 show that, the PO, the peroxide amount being equal and the palladium amount being substantially equal, the catalysts of the present invention completely reduce the peroxidic PFPEs in a lower time compared with those (III), (IV) of the prior art. See the examples 6, 7 compared with 8 and 9 and the example 10 compared with the examples 11 and 12. Furthermore the data of the example 13 compared with those of the example 8 show that it is possible to reduce the peroxide with speeds similar to those of the Pd supported on $CaF_2$ but using only about $\frac{1}{5}$ of the Pd amount.

The invention claimed is:

1. A continuous process for preparing perfluoropolyethers of formula $$T-O-(R_F)_z-T' \quad (I)$$

wherein:

T is a functional end group selected from the group consisting of $-CF_2COF$, $-CF(CF_3)COF$, $-CF_2CF_2COF$, $-CF_2CF_2CF_2COF$, $-CF_2C(O)CF_3$, and $-COF$; T'=T or T' is selected from non functional end groups $-CF_3$, $-CF_2CF_3$, $-C_3F_7$, $-C_4F_9$, one fluorine atom being optionally substituted by one chlorine or hydrogen atom, z=0 or 1;

$R_F$ is a (per)fluoro(poly)oxyalkylene chain containing one or more fluorooxyalkylene repeating units selected from the group consisting of $(CF_2O)$, $(CF(CF_3)O)$, $(CF_2CF_2O)$, $-(CF_2CF(CF_3)O)-$, $-(CF(CF_3)CF_2O)-$, $-(CF_2CF_2CF_2O)$, $(CF_2CF_2CF_2CF_2O)$, and $-(CF_2)_j-CFZ-O-$ wherein j is an integer from 0 to 3, and Z is a fluorooxyalkylene chain comprising from 1 to 20 repeating units selected from the above reported fluorooxyalkylene units;

comprising the reduction of peroxidic perfluoropolyethers comprising one or more of the following fluorooxyalkylene repeating units: $(CF_2O)$, $CF(CF_3)O)$, $(CF_2CF_2O)$, $-(CF_2CF(CF_3)O)-$, $-(CF(CF_3)CF_2O)-$, $-(CF_2CF_2O)$, $(CF_2CF_2CF_2O)$, $-(CF_2)_j-CFZ-O-$ wherein j, Z are as defined above, by using gaseous hydrogen in the presence of a catalyst in the form of pellets or powder comprising one or more metals of the VIII group supported on graphitic materials, wherein the graphitic materials consist essentially of graphic carbon, and wherein the reduction comprises continuously feeding the peroxidic perfluoropolyethers and gaseous hydrogen into a reactor and continuously removing HF formed during the reduction of the peroxidic perfluoropolyethers from the reactor for at about 50 hours.

2. The process according to claim 1, wherein the perfluoropolyethers of formula $$T-O-(R_F)_z-T' \quad (I)$$

have number average molecular weight between 200 and 8,000;

and wherein the perfluoropolyethers have peroxidic $-O-O-$ bonds, comprising one or more of the following units $(CF_2O)$, $(CF(CF_3)O)$, $(CF_2CF_2O)$, $(C_3F_6O)$, $(CF_2CF_2CF_2CF_2O)$, and the end groups are selected from those indicated for T, T', and having an oxidizing power (PO), defined as grams of active oxygen per 100 grams of peroxidic perfluoropolyether, ranging between 0.02% and 4.5%.

3. The process according to claim 1, wherein the temperature is in the range 20° C.-200° C.

4. The process according to claim 1, wherein the perfluoropolyethers of formula (I) have a number average molecular weight between 200 and 5,000.

5. The process according to claim 1, wherein carbonyl perfluoropolyethers are prepared, of formula $$T-O-(R_F)_z-T' \quad (I)$$

wherein:

T, T', equal to or different from each other, are selected from the above defined end groups with the proviso that the non functional end groups are lower than 10% molar with respect to the total of the end groups T and T';

z, $R_F$ and the number average molecular weight are as defined above in claim 1;

starting from peroxidic perfluoropolyethers of formula $$A-O-(CFX1O)_a(CF_2CF_2O)_b(C_3F_6O)_c(CF_2CF_2CF_2O)_d(O)_h-B \quad (II)$$

wherein

A, B, equal to or different from each other, are selected from the groups defined above for T, T';

X1=F, $CF_3$;

the a, b, c, d indexes are integers, zero comprised, and such that the number average molecular weight of the peroxidic PFPE is between 300 and 150,000, and the h index is an integer, different from zero, such as to have an oxidizing power (PO), defined as grams of active oxygen per 100 grams of peroxidic perfluoropolyether, ranging between 0.02% and 4.5%.

6. The process according to claim 5, wherein, when the peroxide PO is higher than 2%, the peroxidic perfluoropolyether is diluted with a suitable solvent.

7. The process according to claim 1, wherein the perfluoropolyethers of formula (I) are those having z=1.

8. The process according to claim 1, wherein in the perfluoropolyethers of formula (I) $R_F$ is selected from the following structures:

a) $-(CF_2O)_n(CF_2CF_2O)_m(CF_2CF_2CF_2O)_p(CF_2CF_2CF_2CF_2O)_q-$ wherein the m, n, p, q indexes are integers, zero included, such that the number average molecular weight is between 200 and 5,000;

b) $-(CF_2CF(CF_3)O)_r(CF_2CF_2O)_s(CF_2O)_t(CF(CF_3)O)_u-$ wherein r, s, t, u are integers, zero included, such that the number average molecular weight is between 200 and 5,000; when s is different from zero, r/s is between 0.1 and 10, extremes included; when (r+s) is different from zero, (t+u)/(r+s) is between 0.01 and 0.5, extremes included; or c) $-(CF_2CF(CF_3)O)_e(CF_2O)_f(CF(CF_3)O)_g-$ wherein e, f, g are integers, zero included, such that the number average molecular weight is between 200 and 5,000; when e is different from zero, (f+g)/e is between 0.01 and 0.5, extremes included.

9. The process according to claim 1, wherein the peroxidic perfluoropolyethers are selected from the following classes:

(1) $Xo-O(CF_2CF_2O)_{r1}(CF_2O)_{s1}(O)_{t1}-Xo'$ wherein

Xo and Xo', equal to or different from each other, are $-CF_2Cl$, $-CF_2CF_2Cl$, $-CF_3$, $-CF_2CF_3$, $-CF_2COF$, or $-COF$;

r1, s1, t1 are integers such that the number average molecular weight is between 500 and 100,000; r1/s1 is between 0.1 and 10, s1 being different from zero; t1 is an integer such that an oxidizing power (PO), defined as grams of active oxygen per 100 grams of peroxidic perfluoropolyether, ranges between 0.02% and 4.5%;

(2) 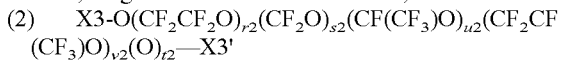

wherein

X3 and X3', equal to or different from each other, are —$CF_2Cl$, —$CF_2CF_2Cl$, —$CF_2CF_3$, —$CF_3$, —$C_3F_7$, —$CF(CF_3)COF$, —COF, —$CF_2COF$, or —$CF_2C(O)CF_3$;

r2, s2, t2, u2, v2 are integers, zero included, such that the number average molecular weight is between 500 and 100,000; t2 is a number such that the oxidizing power (PO) ranges between 0.02% and 4.5%; or (3) 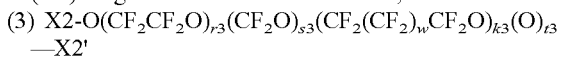

wherein

X2 and X2', equal to or different from each other, are —$CF_2COF$, or —COF;

w=1 or 2;

r3, s3, t3, k3 are integers such that the number average molecular weight is between 700 and 100,000; r3/s3 is between 0.2 and 10, k3/r3+s3) is lower than 0.05; t3 is an integer such that the oxidizing power (PO) ranges between 0.02% and 4.5%.

10. The process according to claim 1, wherein the gaseous hydrogen is continuously fed, in a stoichiometric amount with respect to the fed peroxide moles or with a stoichiometric excess of about 10%.

11. The process according to claim 1, wherein the metals of the VIII group of the catalyst are selected from the group consisting of Pd, Pt, Rh, Ru, Ir, Os and their mixtures.

12. The process according to claim 1, wherein the metal concentration on the support is generally between 0.1% and 10% with respect to the total catalyst weight.

13. The process according to claim 1, wherein the graphitic materials have a surface area between 0.1 and 1,000 $m^2/g$.

14. The process according to claim 1, wherein the catalyst amount is between 0.001% and 10% with respect to the peroxidic perfluoropolyether.

15. The process according to claim 1, wherein the catalyst comprises Pd supported on the graphitic materials.

16. The process of claim 1, wherein the pellets have a granulometry range from 1 to 5 mm and the powder has a granulometry between 0.5 and 300 micron.

* * * * *